(12) United States Patent
Thorwirth

(10) Patent No.: US 7,738,677 B2
(45) Date of Patent: Jun. 15, 2010

(54) EFFICIENT APPLICATION OF VIDEO MARKING TECHNOLOGIES

(75) Inventor: Niels Thorwirth, San Diego, CA (US)

(73) Assignee: Verimatrix, Inc., San Diego, CA (US)

( * ) Notice: Subject to any disclaimer, the term of this patent is extended or adjusted under 35 U.S.C. 154(b) by 0 days.

(21) Appl. No.: 11/749,589

(22) Filed: May 16, 2007

(65) Prior Publication Data

US 2007/0291979 A1 Dec. 20, 2007

Related U.S. Application Data

(63) Continuation-in-part of application No. 11/489,754, filed on Jul. 19, 2006.

(60) Provisional application No. 60/800,941, filed on May 17, 2006.

(51) Int. Cl.
*G06K 9/00* (2006.01)

(52) U.S. Cl. .................................................. 382/100

(58) Field of Classification Search .................. 382/100
See application file for complete search history.

(56) References Cited

U.S. PATENT DOCUMENTS

| | | | | |
|---|---|---|---|---|
| 5,748,783 | A | * | 5/1998 | Rhoads ........................ 382/232 |
| 6,141,753 | A | | 10/2000 | Zhao et al. |
| 6,275,260 | B1 | * | 8/2001 | Anderson .................... 348/239 |
| 6,385,329 | B1 | | 5/2002 | Sharma et al. |
| 6,535,617 | B1 | | 3/2003 | Hannigan et al. |
| 6,573,945 | B1 | * | 6/2003 | Wu et al. ..................... 348/584 |
| 6,590,996 | B1 | | 7/2003 | Reed et al. |
| 6,614,914 | B1 | | 9/2003 | Rhoads et al. |
| 6,718,047 | B2 | | 4/2004 | Rhoads |
| 7,062,069 | B2 | | 6/2006 | Rhoads |
| 7,113,615 | B2 | | 9/2006 | Rhoads et al. |
| 7,131,760 | B2 | | 11/2006 | Mayer et al. |
| 7,142,691 | B2 | * | 11/2006 | Levy .......................... 382/100 |
| 7,158,657 | B2 | | 1/2007 | Okazaki et al. |
| 7,319,469 | B2 | | 1/2008 | Dawson |
| 7,319,775 | B2 | | 1/2008 | Sharma et al. |
| 7,369,678 | B2 | | 5/2008 | Rhoads |
| 7,391,880 | B2 | | 6/2008 | Reed et al. |
| 7,424,131 | B2 | | 9/2008 | Alattar et al. |
| 2004/0250079 | A1 | | 12/2004 | Kalker et al. |

OTHER PUBLICATIONS

International Search Report for International Application PCT/US07/69076, Report completed May 14, 2008, Report mailed Jun. 5, 2008, 2 pages.

Written Opinion of the International Searching Authority for International Application PCT/US07/69076, Opinion completed May 14, 2008, Opinion mailed Jun. 5, 2008, 3 pages.

* cited by examiner

*Primary Examiner*—Tom Y Lu
(74) *Attorney, Agent, or Firm*—Kauth, Pomeroy, Peck & Bailey LLP

(57) ABSTRACT

Systems and methods are described for rendering information to be embedded in media content at a first location and for embedding the rendered information into the media content at a second location. In many embodiments, the embedding process is less processor intensive than the rendering process and can be performed on a consumer electronics device such as a set top box, using existing processing mechanisms. One embodiment of the invention includes rendering the information into an image at a first location and embedding the image in the media at a second location in order to achieve efficient marking of the media content.

39 Claims, 2 Drawing Sheets

EFFICIENT APPLICATION OF VIDEO MARKING TECHNOLOGIES

CROSS REFERENCE TO RELATED APPLICATIONS

This application is a continuation-in-part of U.S. patent application Ser. No. 11/489,754 filed Jul. 19, 2006. This application also claims priority to U.S. Provisional Patent Application Ser. No. 60/800,941, filed May 17, 2006. The disclosure of both applications is incorporated herein by reference in its entirety.

TECHNICAL FIELD

The invention relates generally to marking video, and more particularly to efficient application of marking technologies for digital video.

BACKGROUND OF THE INVENTION

Digital representation, storage, distribution, and duplication of digital media have become very popular because they are inexpensive, easy to use, and maintain the quality of the media. These advantages however have enabled widespread, illegal distribution and use of copyrighted material, such as unauthorized distribution of digital images and videos over the Internet, for example. As a result, the rightful copyright owners are deprived of their revenues.

One group of technologies that can be deployed to control that unauthorized distribution involves embedding imperceptible information in a video. These technologies are often referred to as digital watermarking, forensic marking or video marking and these terms are used interchangeably in this text. The embedded information can be used to embed the identity of the copyright owner, distributor, or recipient of the media in a secure, imperceptible and robust fashion. The information can, for example, be embedded during playback or reception by an individual, and relate to the time of reception and the individual recipient by means of an identification number. If the copy is later found distributed illegally, the information can be retrieved and the original recipient, who is responsible for the illegal distribution can be identified. This technology can be used for tracking of individual media asset copies and enforcement of copyright laws. Content marking is an important component of digital media distribution and enables digital delivery of copyright protected content by limiting the risk of illegal distribution e.g., through peer to peer file sharing sites. Because the distribution can be tracked to the last legal recipient, the risk of being held responsible for copyright violations increases, as the person distributing the content can be identified.

While the tracking number can be embedded using obvious and visible modifications, they are less destructive to the content and better secured against removal, if applied in an invisible fashion.

In order to apply a robust mark (i.e., the mark remains readable after the content has been modified through compression, re-recording, filtering or other processes), changes to the content have to be applied that modify the actual video, image, or audio signal. For the mark to remain imperceptible, these modifications are applied in a hidden and slight manner.

In order to archive the required robustness, the modifications are typically applied in a distributed fashion, with numerous modifications spread over a large area of a video frame or time (i.e., over a number of frames), or both. Often, the manipulations are applied in a transformed domain, such as a frequency or wavelet transformation. These transformations allow for invisible marking modifications in a domain that remains largely intact after modifications to the video, and allows aggregation of modifications that are distributed over a number of frames when the media is observed. These transformations also enable a strong signal in a transformed domain to be embedded. The signal is largely imperceptible in the domain that is used to present the media to the user.

The number of modifications required for embedding the mark, and the number of calculations required to transform the content in the domain where the content can be marked, pose a challenge for processing in environments where fast and efficient embedding of a mark is required. An example of such an environment is an environment that employs streaming media, which delivers a media to a consumer electronics device via a network.

When embedding information about the recipient of the streaming/transmitted media, the information can be embedded at the receiving end, so that the sender is not burdened with marking and sending individual streams for every recipient. The sender delivers the identical media copy to all recipients and the media is marked at the time it is received at the recipient's end. Thereafter, each user is presented with a copy that is individually marked. In this scenario, the limitation of timely processing is even greater, since the machine on the receiving end often has very limited processing power available to apply the mark. This limitation of processing power makes it prohibitive to apply forensic marks that contain information about the recipient in media in most distribution environments in use today.

SUMMARY OF INVENTION

Systems and methods are described for rendering information to be embedded in media content at a first location and for embedding the rendered information into the media content at a second location. In many embodiments, the embedding process is less processor intensive than the rendering process and can be performed on a consumer electronics device such as a set top box. One embodiment of the invention includes rendering the information into an image at a first location and embedding the image in the media at a second location in order to achieve efficient marking of the media content.

In a further embodiment of the method of the invention, the information embedded in media content is transformed from a frequency domain to a rendered image.

In another embodiment of the method of the invention, the information is modified according to perceptual characteristics of the media content.

In a still further embodiment of the method of the invention, the perceptual characteristics of the media content are determined from a compressed electronic file.

In still another embodiment of the method of the invention, the information comprises metadata related to the media content.

In a yet further embodiment of the method of the invention, the information identifies a time and location of media content playback.

In yet another embodiment of the method of the invention, the information identifies a copyright owner or recipient of the media content.

In a further embodiment again of the method of the invention, the information represents a database index.

In another embodiment again of the method of the invention, the embedding of the image is accomplished using an on-screen display of a set top box.

In a further additional embodiment of the method of the invention, the first location is a video delivery head end and the second location is a consumer electronics set top box receiving the video.

In another additional embodiment of the method of the invention, the image created in the first location is stored for repeated or subsequent use.

An embodiment of the invention includes a server configured to render the information at a first location and to communicate the rendered information to a device connected to the server via a network. In addition, the device is configured to embed the image in the media content at a second location.

In a further embodiment of the invention, the network is a cable network and the device is a digital set top box.

In another embodiment of the invention, the server is configured to transform the information that is to be embedded in the media content from the frequency domain to create the rendered image.

In a still further embodiment of the invention, the server is configured to determine the perceptual characteristics of the content and the server is configured to modify the information according to the perceptual characteristics of the media content.

In still another embodiment of the invention, the server is configured to determine the perceptual characteristics of the media from a compressed electronic file.

In a yet further embodiment of the invention, the device includes hardware configured to generate on screen displays on an output device, the device is configured to embed the rendered information in the media content by displaying the rendered information as an on screen display.

In yet another embodiment of the invention, the first location is a video delivery head end and the second location is a user site.

In a further additional embodiment of the invention, the server is configured to store the rendered image for subsequent use.

In another additional embodiment of the invention, the device is configured to receive the media content via the network.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

Figure 1:
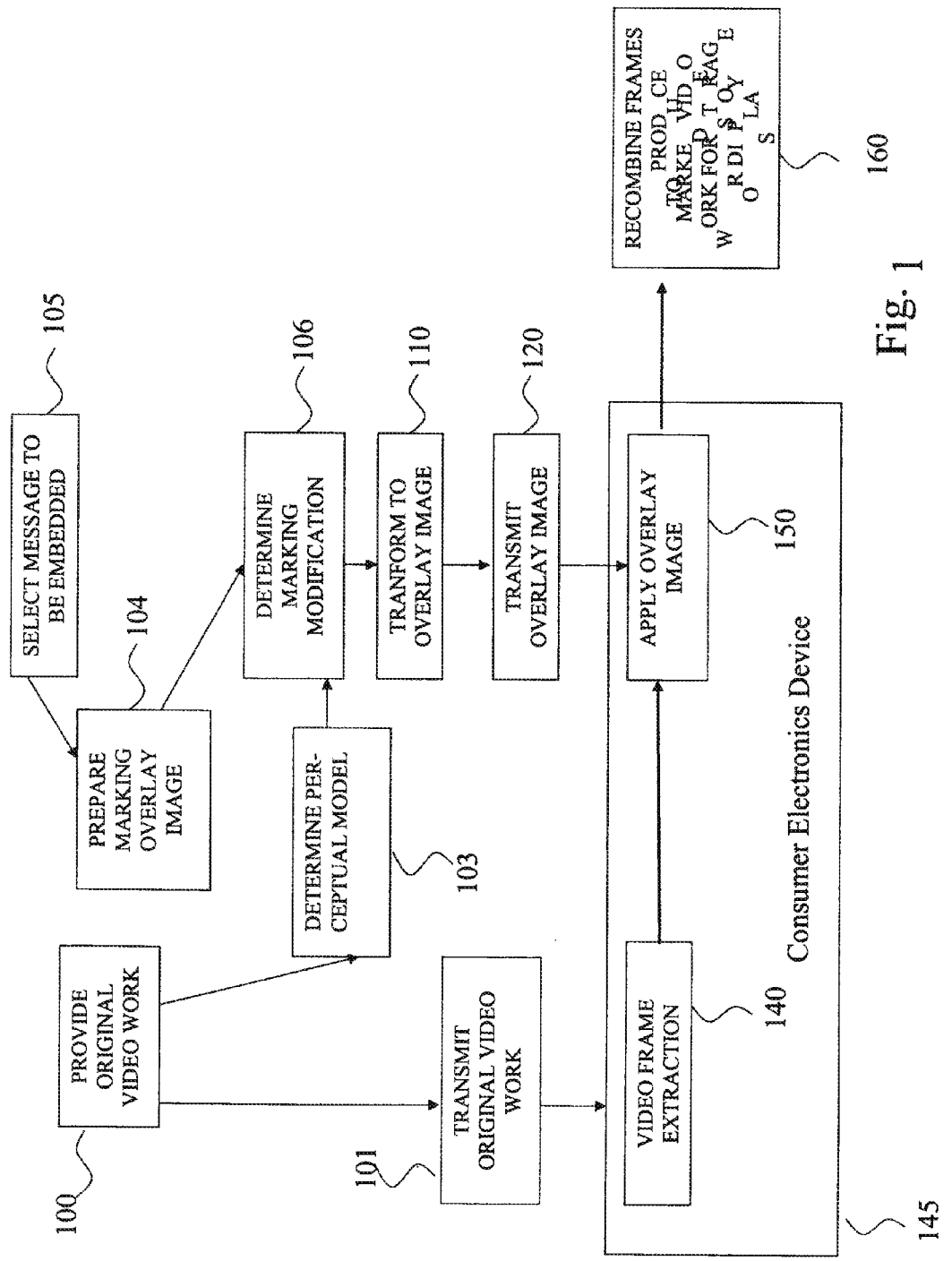
FIG. 1 is an illustrative flow diagram of a forensic marking process, according to one embodiment of the invention.

The present invention involves a system and method of rendering a forensic mark into a baseband, uncompressed, spatial transformation image or video frame, in which modifications to media content (video) are expressed in modifications to single pixels. The application of these pre-processed representations of the mark can subsequently be applied very efficiently in a different location or system by a simple combination of the mark rendered into an image with the image or video frame to be marked. In one embodiment of the invention, the combination is applied via addition, in another via alpha blending that can be performed on a per pixel basis.

marking technology that can be applied using the method of the present invention is described in U.S. patent application Ser. No. 11/489,754 entitled "Covert and Robust Mark for Media Identification", the disclosure of which is incorporated herein by reference above.

Currently available end user electronics often provide efficient means of combining images to the displayed video. Such systems use the available technology to display menus, and overlay graphics, in a video. These display elements can often be applied in translucent fashion. In particular, end consumer devices like set top boxes that are used to receive media content delivered over a network, provide the possibility to overlay graphics in this manner (see for example the set top boxes described in U.S. patent application Ser. No. 11/489,754). The approach is often referred to as overlay buffer or on screen display. The actual manipulation can typically be adjusted with an alpha blending value that adjusts the strength of the overlaid graphic when combined with the underlying video display. The common use for this on screen display is the display of menus and information about the video playing or as a user interface for other applications running in the device. This on screen display can be used to modify the media content/video in a way that allows embedding of imperceptible forensic marking information.

Several embedding approaches exist that embed a digital watermark or forensic tracking information in digital video. The approaches differ from each other in the location in space or time and the domain in which manipulations are performed. Some embedding approaches require that the manipulations occur in a specified position or sequence in time. Other embedding approaches require manipulation of pixels at a location specified by the pixel's position or characteristics. A common characteristic that these image embedding systems share is that the actual modification to the frames can also be accomplished by simple addition to pixel values in each frame of the media content or video, if some prior processing took place to analyze how to modify these pixels. When the pixel additions are applied in this manner, the embedding process can be performed very efficiently, thus enabling an environment with limited processing resources to embed the image.

In one embodiment, the application of the mark is further simplified by performing the processes of adding the mark by using an efficient image application method provided in many set top boxes, referred to as on screen display. The on screen display adds a given image (in this case the transformed mark) with a given strength (defined by an "alpha value") to each frame of the video.

The preparation of the mark to be represented as an image can be performed once per movie, e.g., in the head end that delivers the content. In this case, the calculation has to be performed only once, but the data has to be transmitted to the location where the mark is embedded. Alternatively the preparation can occur in the location where it is applied although the processing resources might be limited.

Systems for forensic marking often use perceptual models that indicate the positions in space and time where modifications to the video are less visible. To enable the application of variations that are taking perceptual properties of the video into consideration, the information to be embedded as a mark is varied according to the transmitted content. Examples of the use of perceptual properties and perceptual models in the embedding of marks are described in U.S. patent application Ser. No. 11/489,754. The perceptual properties can be derived from the compressed content in simple measurements such as compression ratio and bit rate. In another embodiment, the video to be sent is analyzed one time and the information of perceptibility in certain locations and frames is stored with the movie. While the movie is delivered to a device, the marking information is modified accordingly.

The overlay image that is applied to the video in accordance with many embodiments of the invention can be applied using an often existing alpha blending mechanism that allows the image or individual pixels to be applied in a translucent fashion. In one embodiment of the invention this approach is used to allow very slight, invisible manipulation to the image, while embedding the mark. In another embodiment the overlay image is opaque and is largely identical to the video frame that it is covering. It is updated with every frame. The typically slight difference between the image and the video that it is covering constitutes the mark.

Systems for marking media content in accordance with embodiments of the invention can require that the information to be embedded be transformed into a different domain, such as the frequency domain (e.g., DCT, wavelet, or Fast Fourier). While the transformation is required in order to prepare the information to be embedded, the information can generally be separated in a way that the transformation is only required once and the information can be assembled to create variations of different data to be embedded in a simple manner. The modification is then applied in the spatial domain by addition of images to video frames. This can be applied by a remote device possessing less processing power Many systems for marking media content in accordance with embodiments of the present invention embed static information that is independent of the frame content. For these systems, the transformation is applicable without knowledge of the underlying media that the modification is applied to. Other systems require a modification applied to the actual media and the media content is modified according to its content. These systems analyze the content before creating the overlay. The process of analyzing the video is only required to be performed once, while it can be applied multiple times for every copy that is marked with different information. A significant gain in performance is archived if the analysis is not performed on every frame but on every $N^{th}$ frame assuming that the video content does not change significantly over a short period of time.

Referring to FIG. 1, in one embodiment, a flow diagram of a forensic marking process is shown. The typically compressed original video content 100 is used for distribution of several copies that should ultimately be marked with unique information. To reduce the effort on the distributing end and the required distribution bandwidth, the same file is digitally delivered 101 to the consumer electronic device of the recipients 145 where it is actually marked. Prior to delivery, the file is analyzed and a perceptual model is determined that identifies locations of the video that are suitable to hide imperceptible information. This can be useful to reduce the required processing power at the receiving end. When the message to be embedded is selected 105 (e.g., when the recipient is determined), the overlay image is prepared by applying the marking procedure and creating components that can be used to assemble the information to be embedded 104. With help of the perceptual model 103 that is derived from the original video and determines the sensitivity of modification in accordance with the video characteristics, the modification required to embed the mark is derived 106. The information is subsequently compiled to create an overlay image that can be applied to at least one of the video frames. In one embodiment, the preparation of the mark above and the following steps are applied in the consumer electronics device. In another embodiment, they are implemented before transmission and the result is transmitted to the consumer electronics device 145. The consumer electronics device applies the overlay image to the video frame 150 to produce a combined frame of the uniquely marked video 160.

Figure 2:
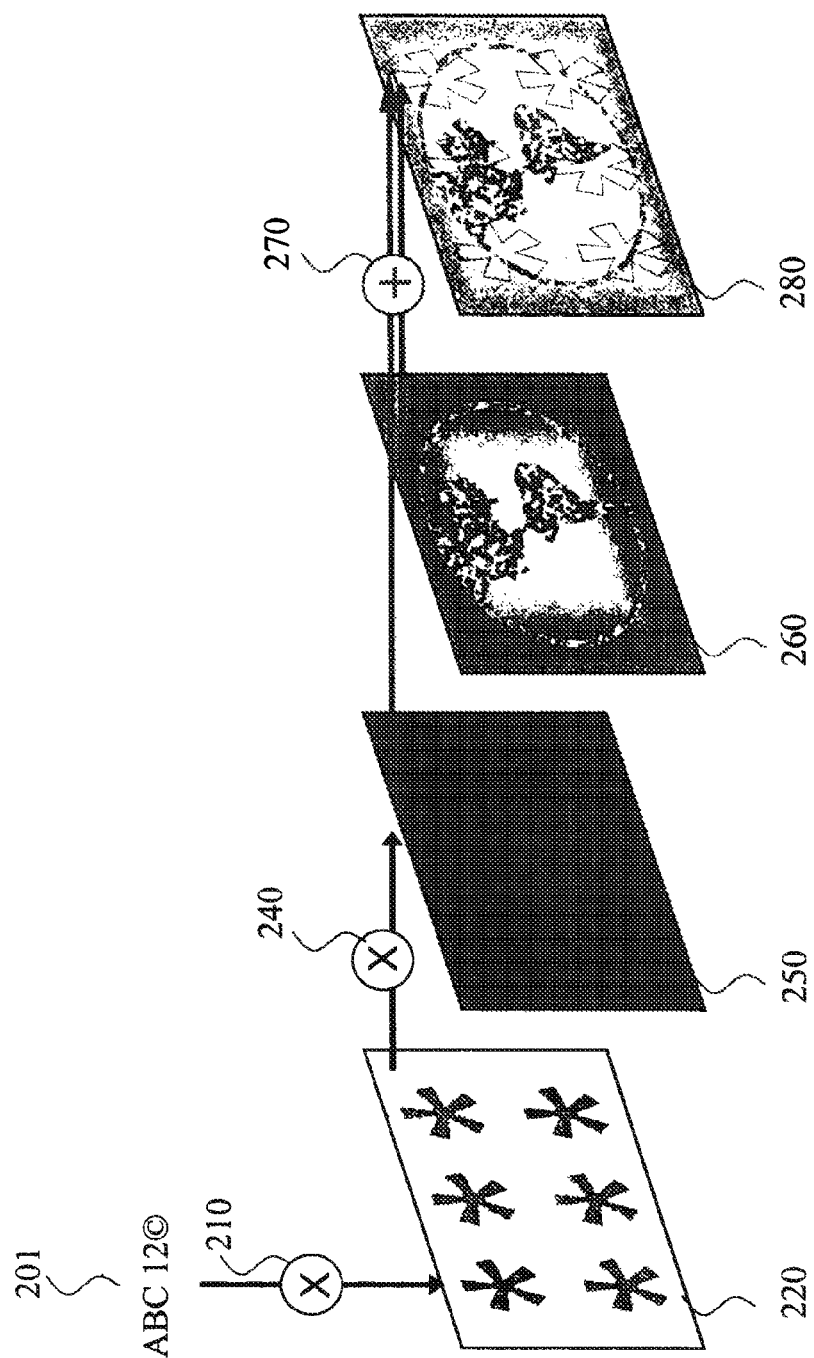
FIG. 2 is an illustrative diagram of a forensic mark being created as an image, converted into an overlay image, and subsequently applied to a video frame, thereby marking the video frame with the overlay image, according to one embodiment of the invention.

Referring to FIG. 2, in one embodiment, a diagram of a forensic mark being created as an image, converted into an overlay image and subsequently applied to a video frame is shown. The information to be embedded in this example is "ABC 12©" 201. It is assembled 210 from preprocessed marking information into an image representation 220. The image representation holds the marking modifications that could be human readable or machine readable. The image representation is converted 240 into an overlay image 250 with an alpha blending parameter that indicates the strength with which the image 220 is to be combined with a frame 260. The combination 270 of the image representation 250 with the frame 260 to produce a marked video frame 280 is typically performed with an alpha blending operation that is defined as follows:

$$S_{x,y,f} = I_{x,y,f} * \alpha_{x,y} + O_{x,y,f} * (1-\alpha_{x,y})$$

$S_{x,y,f}$ is the pixel at position x,y in frame number f of the marked video.

$I_{x,y}$ is the pixel at position x,y of the overlay image.

$\alpha_{x,y}$ alpha value indicating the strength of the overlay image at position x,y.

$O_{x,y,f}$ is the pixel at position x,y in frame number f of the original unmarked video.

In some embodiments, the embedding and extraction of the present invention is implemented in the form of apparatuses for practicing the previously described methods. Such apparatuses may include, but are not limited to, set top boxes that receive, decode, and display video content, VHS tape players, DVD players, TV sets, video projectors, cameras, digital video camcorders, personal computers that process media data, hand held video playback devices, and personal organizers that process video (see for example the systems and set top boxes described in U.S. patent application Ser. No. 11/489,754).

In another embodiment, the present invention is implemented in the form of program code embodied in tangible media, discs, memory, or other machine-readable storage medium. When the program code is loaded into, and executed by, a machine such as a computer, the machine becomes an apparatus for practicing the invention.

In yet other embodiments, the present invention is embodied in the form of program code, whether stored in a storage medium, loaded into and/or executed by a machine, or transmitted over some transmission medium or carrier, such as over electrical wiring or cabling, through fiber optics, or via electromagnetic radiation.

In still another embodiment, the present invention is implemented as a circuit-based system. As would be apparent to one skilled in the art, various functions of circuit elements can be implemented as processing steps in a software program. Such software may be employed in, for example, a digital signal processor, micro-controller, or general-purpose computer.

Variations, modifications, and other implementations of what is described herein may occur to those of ordinary skill in the art without departing from the spirit and scope of the invention. Accordingly, the invention is not to be defined only by the preceding illustrative description.

What is claimed is:

1. A method of embedding information in media content during a process for decoding the media content, comprising:

delivering media content to a decode device configured to decode the media content and output frames of video for display on an output device, where the decode device includes an alpha blending function configured to combine an on screen display and media content during the decoding of the media content to produce a combined frame in which both the on screen display and media content are present and the decode device is configured to output the combined frame for display on the output device;

decoding a frame of the media content;

rendering the information as an overlay image and alpha values according to perceptual characteristics of the media content so that the modifications to the decoded frame are imperceptible when the overlay image is combined with the decoded frame of the media content in accordance with the alpha values using the alpha blending function of the decode device;

at the point during the process of decoding the media content at which an on screen display, when present, is overlaid on the decoded frame using the alpha blending function of the decode device, modifying the decoded frame by using the alpha blending function of the decode device to combine the entire rendered overlay image with the decoded frame of the media content in accordance with the alpha values, and thereby imperceptibly producing a marked frame in which the rendered overlay image is present and imperceptible; and outputting the marked frame from the decode device to the output device for display.

2. The method of claim 1 wherein the information embedded in media content is transformed from a frequency domain to render the image.

3. The method of claim 1 wherein:
the media content is delivered as a compressed file; and
the perceptual characteristics of the media content are determined from the compressed electronic file.

4. The method of claim 1 wherein the information comprises metadata related to the media content.

5. The method of claim 1 wherein the information identifies a time and location of media content playback.

6. The method of claim 1 wherein the information identifies a copyright owner or recipient of the media content.

7. The method of claim 1 wherein the information represents a database index.

8. The method of claim 1 wherein the rendered image is stored for repeated or subsequent use.

9. A device for decoding media content and embedding information in the media content during decoding, comprising:

decode circuitry configured to decode the media content for display on a display device;

alpha blending circuitry configured to overlay an on screen display onto media content during the decoding of the media content to produce a combined frame in which both the on screen display and media content are present for display on an output device;

rendering circuitry configured to render the information as an overlay image and alpha values according to perceptual characteristics of the media content so that the modifications to the decoded frame are imperceptible when the overlay image is combined with the decoded frame of the media content in accordance with the alpha values using the alpha blending function of the decode device; and wherein the device is configured to imperceptibly embed the information in the media content at the point during the process of decoding the media content at which an on screen display, when present, is overlaid on the decoded frame using the alpha blending function of the decode device, the embedding being achieved by overlaying the entire overlay image onto the decoded frame using the alpha blending circuitry in accordance with the alpha values, thereby imperceptibly producing a marked frame in which the rendered overlay image is present and imperceptible.

10. The device of claim 9, wherein the device is a digital set top box.

11. The device of claim 9, wherein the device is configured to transform the information that is to be embedded in the media content from the frequency domain to create the rendered image.

12. The device of claim 9, wherein
the device is configured to determine the perceptual characteristics of the media content.

13. The device of claim 12, wherein:
the media content is stored as a compressed electronic file;
the device is configured to determine the perceptual characteristics of the media from the compressed electronic file.

14. The method of claim 1, wherein the device renders the image from the information.

15. The method of claim 1, wherein the device determines the perceptual characteristics of the media content.

16. The method of claim 1, further comprising determining the perceptual characteristics of at least one frame of the video sequence and rendered the overlay image and alpha values in accordance with the perceptual characteristics of the at least one frame of the video sequence.

17. The method of claim 1, wherein the media content is delivered over a network.

18. The method of claim 1, wherein the media content is delivered via a fixed media.

19. The device of claim 9, further comprising a microprocessor connected to a memory, wherein the microprocessor is configured to render the information as an overlay image and store the overlay image in memory.

20. The device of claim 19, wherein the microprocessor and memory is the circuitry configured to decode the media content for display on a display device and the circuitry configured to overlay an on screen display onto decoded media content for display on an output device.

21. The method of claim 1, wherein the alpha blending function is implemented as follows:

$$S_{x,y,f} = I_{x,y,f} * \alpha_{x,y} + O_{x,y,f} * (1-\alpha_{x,y})$$

where $S_{x,y,f}$ is the pixel at position x,y in frame number f of the marked video;
$I_{x,y,f}$ is the pixel at position x,y of the overlay image;
$O_{x,y,f}$ is the pixel at position x,y in frame number f of the original video; and
$\alpha_{x,y}$ is the alpha value indicating the strength of the overlay image at position x,y.

22. The system of claim 9, wherein the alpha blending circuitry is configured to perform the following operation:

$$S_{x,y,f} = I_{x,y,f} * \alpha_{x,y} + O_{x,y,f} * (1-\alpha_{x,y})$$

where $S_{x,y,f}$ is the pixel at position x,y in frame number f of the marked video;
$I_{x,y,f}$ is the pixel at position x,y of the overlay image;
$O_{x,y,f}$ is the pixel at position x,y in frame number f of the original video; and
$\alpha_{x,y}$ is the alpha value indicating the strength of the overlay image at position x,y.

23. The method of claim 1, wherein the overlay image and the alpha values are generated by the decode device.

24. The method of claim 1, wherein the overlay image and the alpha values are received by the decode device.

25. A method of embedding information in media content during a process for decoding the media content, comprising:
    delivering media content to a decode device configured to decode the media content and output frames of video for display on an output device, where the decode device includes an alpha blending function configured to combine an on screen display and media content during the decoding of the media content to produce a combined frame in which both the on screen display and media content are present and the decode device is configured to output the combined frame for display on the output device;
    decoding a frame of the media content;
    rendering the information as an overlay image frame and alpha values so that the modifications to the decoded frame are imperceptible when the overlay image frame is combined with the decoded frame of the media content in accordance with the alpha values using the alpha blending function of the decode device;
    at the point during the process of decoding the media content at which an on screen display, when present, is overlaid on the decoded frame using the alpha blending function of the decode device, modifying the decoded frame by using the alpha blending function of the decode device to combine the entire rendered overlay image frame with the decoded frame of the media content in accordance with the alpha values, and thereby imperceptibly producing a marked frame in which the rendered overlay image frame is present and imperceptible; and
    outputting the marked frame from the decode device to the output device for display.

26. The method of claim 25 wherein the information embedded in media content is transformed from a frequency domain to render the image.

27. The method of claim 25 wherein the information comprises metadata related to the media content.

28. The method of claim 25 wherein the rendered overlay image frame is stored for repeated or subsequent use.

29. The method of claim 25, wherein the device renders the image from the information.

30. The method of claim 25, wherein the media content is delivered over a network.

31. The method of claim 25, wherein the alpha blending function is implemented as follows:

$$S_{x,y,f} = I_{x,y,f} * \alpha_{x,y} + O_{x,y,f} * (1-\alpha_{x,y})$$

where $S_{x,y,f}$ is the pixel at position x,y in frame number f of the marked video;
$I_{x,y,f}$ is the pixel at position x,y of the overlay image;
$O_{x,y,f}$ is the pixel at position x,y in frame number f of the original video; and
$\alpha_{x,y}$ is the alpha value indicating the strength of the overlay image at position x,y.

32. The method of claim 25, wherein the overlay image and the alpha values are generated by the decode device.

33. A device for decoding media content and embedding information in the media content during decoding, comprising:
    decode circuitry configured to decode the media content for display on a display device;
    alpha blending circuitry configured to overlay an on screen display onto media content during the decoding of the media content to produce a combined frame in which both the on screen display and media content are present for display on an output device;
    rendering circuitry configured to render the information as an overlay image frame and alpha values so that the modifications to the decoded frame are imperceptible when the overlay image frame is combined with the decoded frame of the media content in accordance with the alpha values using the alpha blending function of the decode device; and
    wherein the device is configured to imperceptibly embed the information in the media content at the point during the process of decoding the media content at which an on screen display, when present, is overlaid on the decoded frame using the alpha blending function of the decode device, the embedding being achieved by overlaying the entire overlay image frame onto the decoded frame using the alpha blending circuitry in accordance with the alpha values, thereby imperceptibly producing a marked frame in which the rendered overlay image frame is present and imperceptible.

34. The device of claim 33, wherein the device is a digital set top box.

35. The device of claim 33, wherein the device is configured to transform the information that is to be embedded in the media content from the frequency domain to create the rendered overlay image frame.

36. The device of claim 33, wherein:
    the device is configured to determine the perceptual characteristics of the media content; and
    the device is configured to modify the overlay image frame generated from the information according to the perceptual characteristics of the media content.

37. The device of claim 36, wherein:
    the media content is stored as a compressed electronic file; and
    the device is configured to determine the perceptual characteristics of the media from the compressed electronic file.

38. The device of claim 33, further comprising a microprocessor connected to a memory, wherein the microprocessor is configured to render the information as an overlay image frame and store the overlay image frame in memory.

39. The device of claim 38, wherein the microprocessor and memory is the circuitry configured to decode the media content for display on a display device and the circuitry configured to overlay an on screen display onto decoded media content for display on an output device.

* * * * *

UNITED STATES PATENT AND TRADEMARK OFFICE
CERTIFICATE OF CORRECTION

PATENT NO. : 7,738,677 B2
APPLICATION NO. : 11/749589
DATED : June 15, 2010
INVENTOR(S) : Niels Thorwirth Page 1 of 1

It is certified that error appears in the above-identified patent and that said Letters Patent is hereby corrected as shown below:

On the face page of the patent, Fig. 1 should be as below:

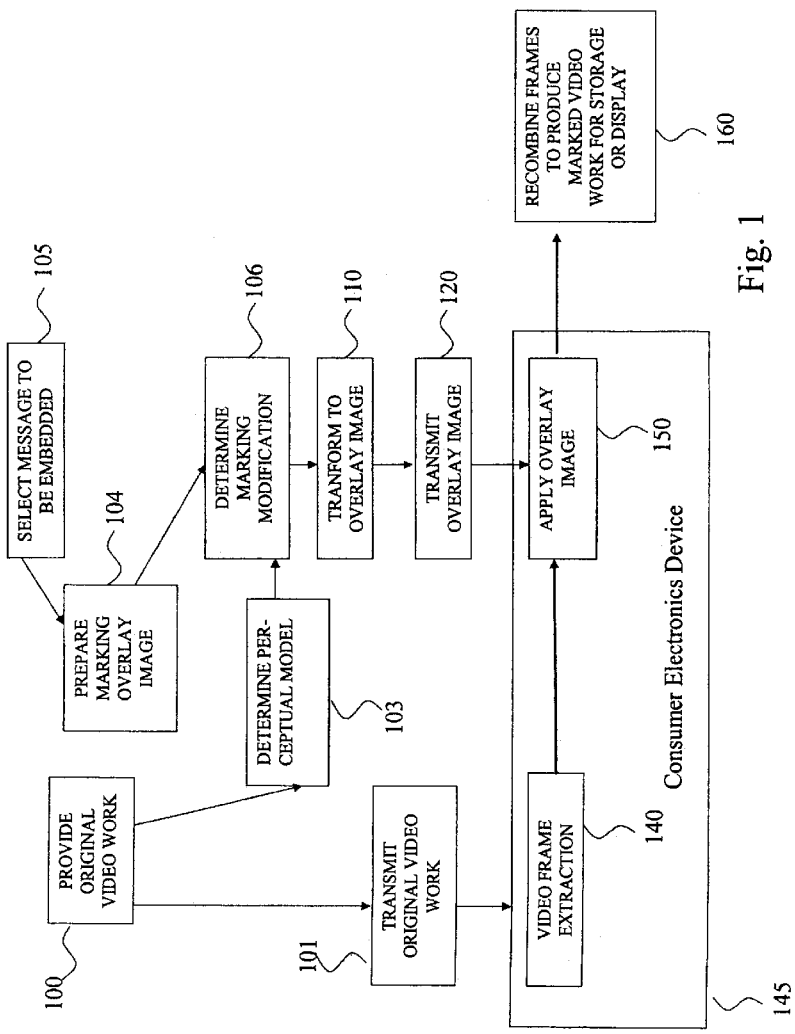

Signed and Sealed this
Twentieth Day of March, 2012

David J. Kappos
*Director of the United States Patent and Trademark Office*